(12) United States Patent
Wade et al.

(10) Patent No.: US 8,574,111 B2
(45) Date of Patent: Nov. 5, 2013

(54) DUAL TORQUE LIMITER

(75) Inventors: Jeremie Alan Wade, Haw River, NC (US); Nicholas Thomas Biersdorf, Apex, NC (US)

(73) Assignee: Deere & Company, Moline, IL (US)

( * ) Notice: Subject to any disclaimer, the term of this patent is extended or adjusted under 35 U.S.C. 154(b) by 254 days.

(21) Appl. No.: 13/104,613

(22) Filed: May 10, 2011

(65) Prior Publication Data

US 2012/0285279 A1  Nov. 15, 2012

(51) Int. Cl.
*F16H 35/10* (2006.01)
*F16H 37/02* (2006.01)
*F16H 37/06* (2006.01)
*B60K 17/34* (2006.01)

(52) U.S. Cl.
USPC ........... 475/264; 475/210; 74/665 F; 180/233

(58) Field of Classification Search
USPC ............ 475/208, 210, 213, 263, 264; 464/46; 474/72; 477/44, 177; 180/233, 248; 74/665 F, 665 G, 665 GA, 665 GE
See application file for complete search history.

(56) References Cited

U.S. PATENT DOCUMENTS

| | | | |
|---|---|---|---|
| 2,659,220 A * | 11/1953 | Cherry | 464/46 |
| 3,780,821 A * | 12/1973 | Prange | 180/250 |
| 3,997,043 A | 12/1976 | Kondo et al. | |
| 4,651,847 A * | 3/1987 | Hermanns | 180/245 |
| 6,000,513 A | 12/1999 | Richards | |
| 6,575,282 B2 * | 6/2003 | Perlick et al. | 192/56.6 |
| 6,581,745 B2 | 6/2003 | Kanazawa | |
| 6,715,379 B2 | 4/2004 | Miguchi et al. | |
| 7,204,337 B2 | 4/2007 | Wildfellner | |
| 7,485,063 B2 * | 2/2009 | Nett et al. | 475/223 |
| 7,562,753 B2 | 7/2009 | Ima et al. | |
| 7,578,759 B2 | 8/2009 | Eck et al. | |
| 8,327,967 B2 * | 12/2012 | Schapf | 180/244 |
| 2002/0152838 A1 | 10/2002 | Miguchi et al. | |
| 2003/0029688 A1 * | 2/2003 | Lovatt | 192/56.6 |
| 2003/0153388 A1 * | 8/2003 | Ima | 464/46 |
| 2004/0059490 A1 | 3/2004 | Nagura et al. | |
| 2005/0255948 A1 | 11/2005 | Chonan | |
| 2007/0221425 A1 * | 9/2007 | Meissner et al. | 180/233 |
| 2009/0054205 A1 | 2/2009 | Maekawa et al. | |
| 2009/0186706 A1 * | 7/2009 | Arden et al. | 464/46 |
| 2011/0087410 A1 * | 4/2011 | Cimatti et al. | 701/60 |

FOREIGN PATENT DOCUMENTS

EP  2159438  3/2010

* cited by examiner

*Primary Examiner* — Roger Pang

(57) ABSTRACT

A dual torque limiter on a utility vehicle having a gear train connected to a main shaft through a first slip clutch assembly that releases the gear train from the main shaft if torque exceeds a predetermined limit. The main shaft is connected to a rear drive train. The front drive train is connected to the main shaft through a second slip clutch assembly that releases the front drive train from the main shaft if torque exceeds a predetermined limit.

16 Claims, 3 Drawing Sheets

DUAL TORQUE LIMITER

FIELD OF THE INVENTION

This invention relates to a drive train of a vehicle, and more specifically to a dual torque limiter to protect the drive train or driveline of a four wheel drive utility or off road vehicle.

BACKGROUND OF THE INVENTION

The drive train or driveline of a utility or off road vehicle may experience overload torque which can result in failure of drive train or driveline components. For example, if the vehicle is airborne so that the front and/or rear wheels leave the ground, an overload torque condition may occur when the vehicle's wheels come back into contact with the ground.

In the past, some utility or off road vehicles have included overload couplings that protect the rear drive train from an overload torque condition. For example, U.S. Pat. Nos. 3,997,043 and 7,204,337 relate to overload couplings that disengage when torque exceeds a predetermined value so that the torque does not damage the drive train or driveline. Other torque limiting mechanisms have been proposed for snowmobiles. For example, U.S. Pat. No. 7,578,759 relates to a torque limiting mechanism with friction plates having a friction surface which contacts another friction surface on reaction plates to limit the torque transferred into the drive train or driveline.

However, there is a need for a dual torque limiter that can protect the front as well as the rear wheel drive train or driveline when torque overload conditions occur.

SUMMARY OF THE INVENTION

A dual torque limiter for a utility vehicle is disclosed having a main shaft rotatably mounted between a front drive train and a rear drive train in the utility vehicle. A front slip clutch assembly releasably secures the main shaft to the front drive train through friction discs or other slip clutch mechanisms releasably engaging the front slip clutch assembly to the main shaft. A rear slip clutch assembly releasably secures the main shaft to the transmission through friction discs or other slip clutch mechanisms releasably engaging the transmission to the main shaft. Each of the front slip clutch assembly and the rear slip clutch assembly independently release the main shaft from the front drive train and transmission respectively if torque through the corresponding drive train exceeds a predetermined maximum slip torque.

DESCRIPTION OF THE PREFERRED EMBODIMENT

Figure 1:
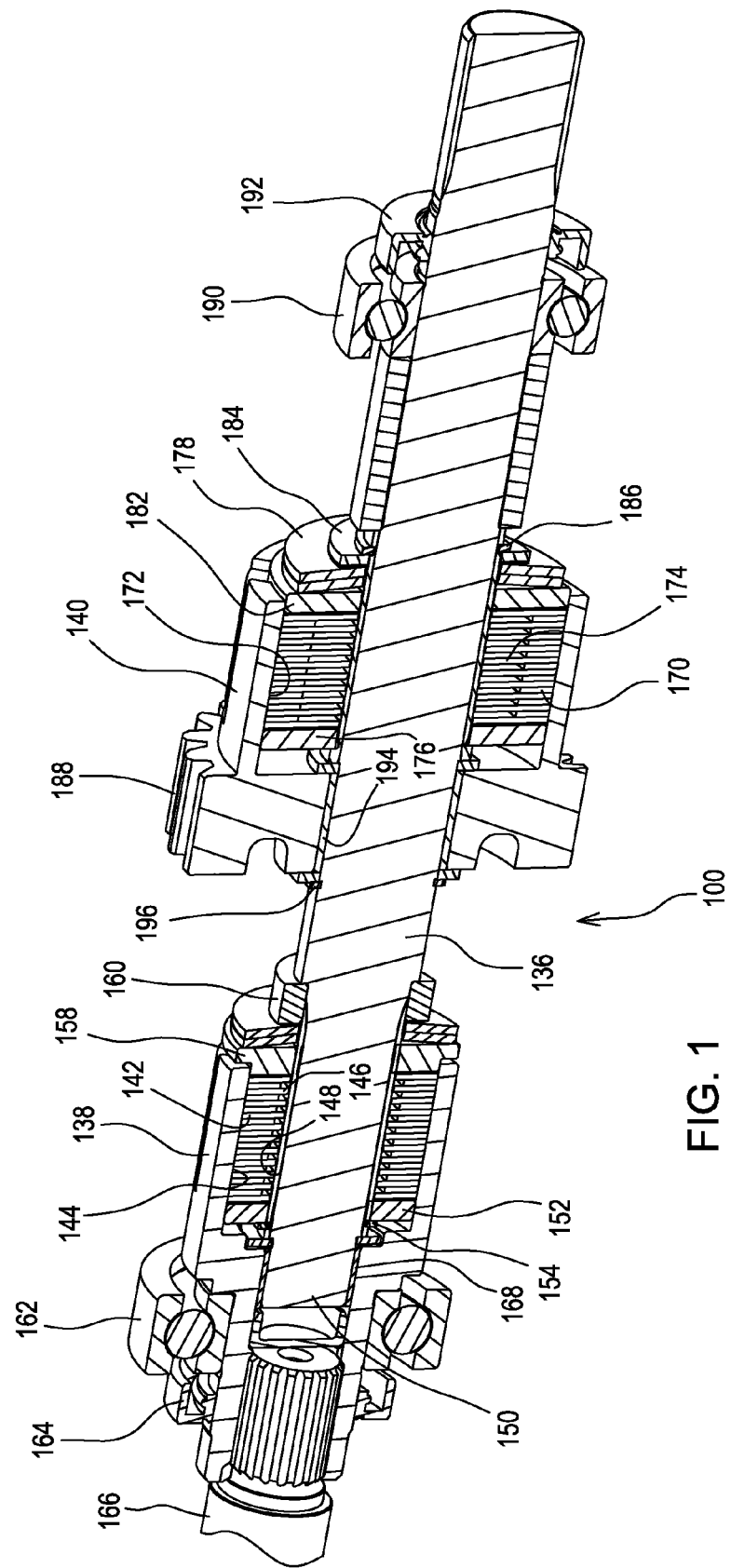
FIG. 1 is a cross section perspective view of a dual torque limiter for drive train or driveline protection according to a preferred embodiment of the invention.
Figure 2:
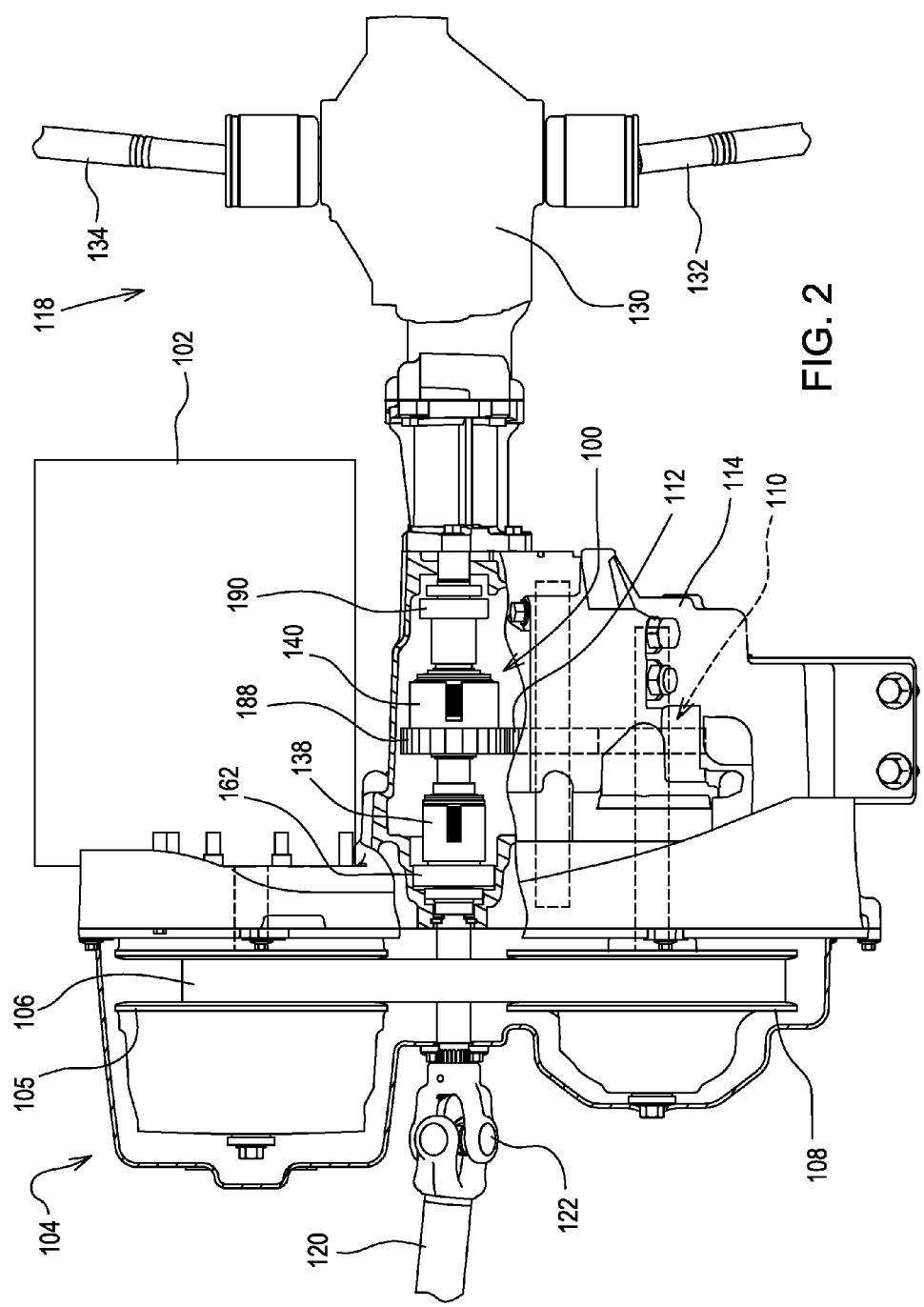
FIG. 2 is a top view, partially in cross section, of a transmission and gear train with a dual torque limiter according to a preferred embodiment of the invention.
Figure 3:
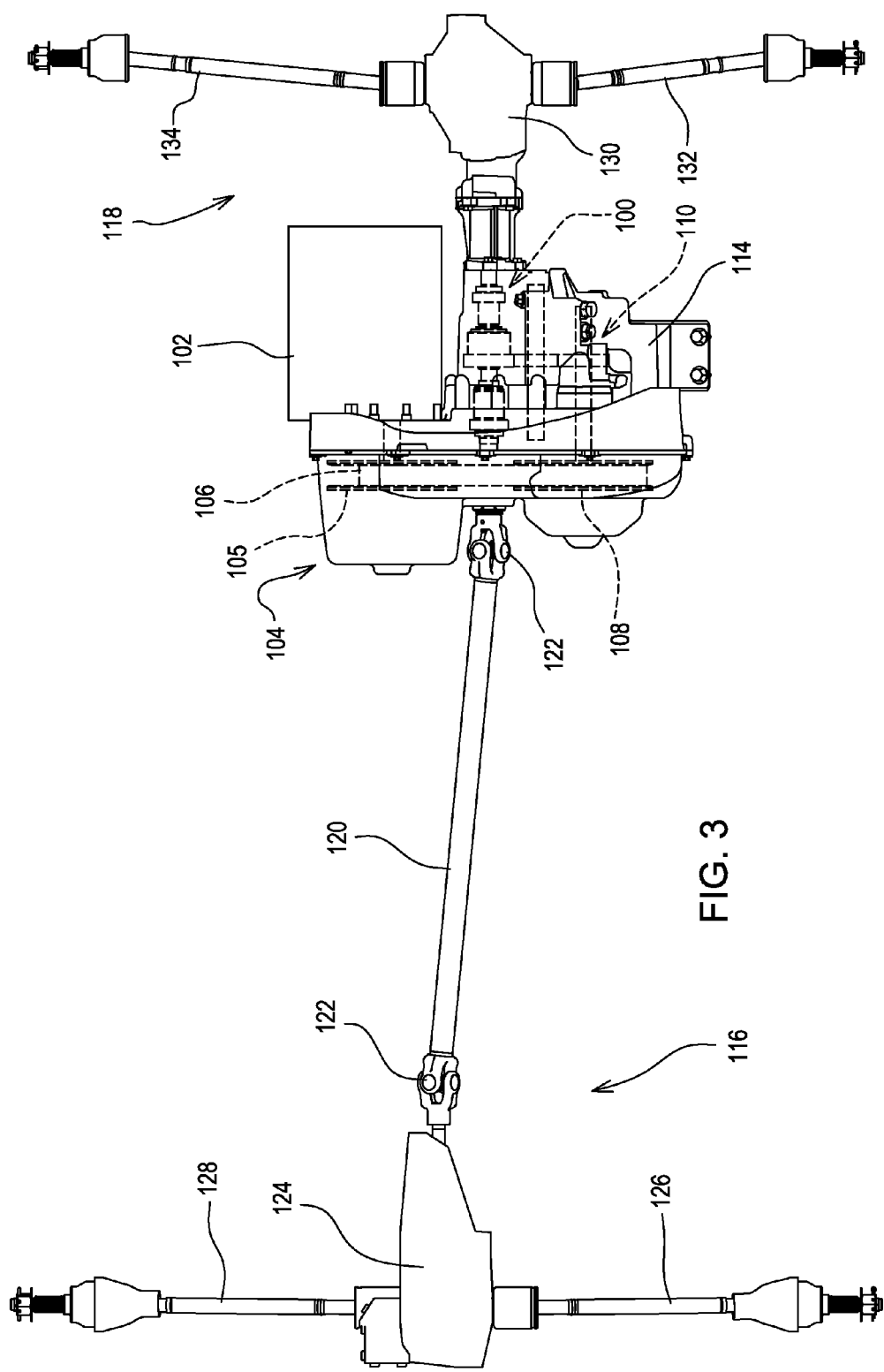
FIG. 3 is a top view, partially in cross section, of a front drive train and rear drive train with a dual torque limiter according to a preferred embodiment of the invention.

In the embodiment shown in FIGS. 1-3, dual torque limiter 100 may be used on a utility or off road vehicle having an internal combustion engine 102 or other power source. The engine or other power source may rotate a shaft connected directly or indirectly to transmission 104. For example, in the embodiment of FIGS. 1-3, the transmission may be a continuously variable transmission having drive pulley 105 and belt 106 to transmit power from the drive pulley to driven pulley 108. The driven pulley may rotate a shaft connected to gear train 110 having output gear 112 that engages the dual torque limiter. Additionally, the dual torque limiter also may be used for vehicles having gear transmissions or various other transmissions.

In one embodiment, dual torque limiter 100 may be positioned in gear box 114 between front drive train 116 and rear drive train 118. The dual torque limiter may protect both the front and rear drive trains from overload conditions using a slip clutch assembly such as a series of load plates or friction discs, along with Belleville washers, to provide slip torque settings. A slip torque setting may be set for each of the front drive train and the rear drive train so that the maximum slip torque for each drive train is below each drive train's breaking point.

In one embodiment, front drive train 116 may include front drive shaft 120 with one or more joints 122 connected to front axle 124 for rotating left front axle shaft 126 and right front axle shaft 128. Rear drive train 118 may include rear axle 130 that rotates left rear axle shaft 132 and right rear axle shaft 134.

In one embodiment, dual torque limiter 100 may include main shaft 136, front slip clutch assembly 138 and rear slip clutch assembly 140. The front slip clutch assembly and rear slip clutch assembly each may releasably engage the main shaft through load plates or friction discs. The front slip clutch assembly and rear slip clutch assembly each may disengage the main shaft if torque if the respective front or rear drive train exceeds specified independent values.

In one embodiment, front slip clutch assembly 138 may be a sleeve shaped body with a plurality of load plates or outer friction discs 142 attached to its internal surface or bore 144. The main shaft of the dual torque limiter may have a plurality of inner friction discs 146 attached to its outer surface 148 adjacent the first end 150. The inner and outer friction discs may be positioned axially between spacers 152 and 158. Spacer 152 may be secured by snap ring 154. Belleville washers 156 may be positioned axially between spacers 158, 160. The Belleville washers may preload the inner and outer friction discs axially together into engagement with sufficient force to secure the front slip clutch assembly to the main shaft, until torque exceeds a predetermined value. The Belleville washers may preload the friction discs so that the torque to slip must exceed, for example, 500 Nm.

In one embodiment, front slip clutch assembly 138 may extend through bearing 162 and radial seal 164, where the front slip clutch assembly may be directly or indirectly connected by intermediate shaft 166 to front drive shaft 120. Bushing 168 also may be provided between the front slip clutch assembly and the first end of the main shaft.

In one embodiment, rear slip clutch assembly 140 may be a sleeve shaped body with a plurality of load plates or outer friction discs 170 attached to its internal surface or bore 172. The main shaft also may have a plurality of inner friction discs 174 attached to its outer surface. The inner and outer friction discs may be positioned axially between spacers 176 and 182. Belleville washers 178 may be positioned axially between spacers 182, 184, and may be secured by snap ring 186. The Belleville washers may preload the inner and outer friction discs axially into engagement with sufficient force to secure the rear slip clutch assembly to the main shaft, until torque exceeds a predetermined value. The Belleville washers may preload the friction discs so that the torque to slip must exceed, for example, 1000 Nm.

In one embodiment, rear slip clutch assembly 140 may include gear 188 on its outer circumference to engage output gear 112 on the transmission or gear train. The rear slip clutch assembly may extend through bearing 190 and radial seal 192, where the rear slip clutch assembly may be directly or indirectly connected to rear axle 130. Bushing 194, positioned within gear 140, and secured by snap ring 196, also may be provided between the rear slip clutch housing and the main shaft.

In one embodiment, the load path for the vehicle's front and rear drive trains through the dual torque limiter is described as follows. The load path for the rear drive train is from the vehicle's rear axle through rear drive train 130 to main shaft, then through the rear load plates or friction discs, then through the rear slip clutch assembly to the transmission. If torque from the rear axle exceeds a specified value, such as when the rear wheels recontact the ground after a vehicle jump, the rear load plates or friction discs disengage, so the rear slip clutch assembly does not transmit the torque to the rear axle.

In one embodiment, the load path from the front drive train is from the vehicle's front axle through the front drive shaft to the front slip clutch assembly, then through the front load plates or friction discs to the main shaft, then through the rear load plates or friction discs, then through the rear slip clutch housing to the transmission and engine. If torque from the front axle exceeds a specified value, such as when the front wheels recontact the ground after a vehicle jump, the front load plates or friction discs disengage, so the front slip clutch assembly does not transmit the torque to the front axle.

In one embodiment, the load path may be combined from the front drive train and rear drive train, such as when the front and rear wheels recontact the ground simultaneously after a vehicle jumps. As a result, the dual torque limiter not only assures that if torque from the front and rear axles exceeds a specified torque the front and rear slip clutches respectively will disengage, but also that the combined load from both drive trains may be high enough so that the main shaft torque exceeds the rear slip clutch disengagement point.

The present invention includes alternative embodiments for releasable engagement devices other than friction plates in the front and rear slip clutches. For example, instead of friction plates, a spring-loaded ratchet clutch may be used having a spring that preloads a plurality of spacers that are physically locked until a specified torque is met. At this point, adjacent plates with teeth will allow a slip to occur and therefore torque is not transmitted to the front drivetrain or rear drivetrain. Another alternative embodiment for the releasable engagement device is a rubber bushing that is fit into a slip clutch housing. This fit may be an interference fit that would transfer torque continuously until a specified torque is transmitted, whereby the rubber bushing would slip inside the housing. In another embodiment, a friction plate preload setting may be achieved by a threaded preload device, such as a nut.

Having described the preferred embodiment, it will become apparent that various modifications can be made without departing from the scope of the invention as defined in the accompanying claims.

The invention claimed is:

1. A dual torque limiter on a utility vehicle, comprising:
   a main shaft rotatably mounted between a front drive train and a rear drive train in the utility vehicle;
   a front slip clutch assembly releasably securing the main shaft to the front drive train through a releasable engagement device between the front slip clutch assembly and the main shaft;
   a rear slip clutch assembly releasably securing a rear drive gear to the main shaft through a releasable engagement device between the rear slip clutch assembly and the rear drive gear;
   wherein each of the front slip clutch assembly and the rear slip clutch assembly independently release the main shaft from the front drive train and the rear drive gear respectively if torque through the corresponding drive train exceeds a predetermined torque.

2. The dual torque limiter of claim 1 wherein an output torque of the front slip clutch assembly passes through the rear clutch assembly before reaching a gear train of the utility vehicle.

3. The dual torque limiter of claim 1 further comprising a gear on the rear slip clutch assembly that engages the rear drive gear.

4. The dual torque limiter of claim 1 wherein the releasable engagement device is a plurality of friction discs.

5. The dual torque limiter of claim 1 wherein the main shaft extends at least partially through a transmission housing in the utility vehicle.

6. A dual torque limiter of a utility vehicle, comprising:
   a front drive train connected to a front slip clutch assembly with a plurality of friction discs attached thereto;
   a rear drive train connected to a rear slip clutch assembly with a plurality of friction discs attached thereto;
   a main shaft inserted through the front slip clutch assembly and through the rear slip clutch assembly, the main shaft having a plurality of releasable engagement devices attached thereto; and
   pair of springs urging the outer and the inner friction discs into engagement; the springs allowing disengagement of the releasable engagement devices at a predetermined torque limit.

7. The dual torque limiter of claim 6 wherein each spring provides a different predetermined torque limit.

8. The dual torque limiter of claim 6 wherein the front drive train includes a universal joint connected to a front drive shaft.

9. The dual torque limiter of claim 6 wherein the rear drive train includes a drive shaft connected to a rear axle.

10. The dual torque limiter of claim 6 further comprising a gear train rotatably engaging the rear slip clutch assembly.

11. The dual torque limiter of claim 10 wherein an output torque of the front slip clutch assembly passes through the rear clutch assembly before reaching the gear train.

12. The dual torque limiter of claim 10 further comprising an engine rotating a continuously variable transmission connected to the gear train.

13. The dual torque limiter of claim 6 wherein the releasable engagement devices are a plurality of friction discs.

14. A dual torque limiter on a utility vehicle, comprising:
   a gear train connected to a main shaft through a rear slip clutch assembly that releases the gear train from the main shaft if torque exceeds a predetermined limit;
   the main shaft connected to a rear drive train; and
   a front drive train connected to the main shaft through a front slip clutch assembly that releases the front drive train from the main shaft if torque exceeds a predetermined limit.

15. The dual torque limiter of claim 14 further comprising Belleville washers urging the front and rear slip clutch assemblies into engagement.

16. The dual torque limiter of claim 14 further comprising a continuously variable transmission connecting the gear train to an engine.

\* \* \* \* \*